Nov. 12, 1957  H. DIEKMANN ET AL  2,812,997
RECORDING APPARATUS PARTICULARLY FOR
MEASURING SHORT INTERVALS OF TIME
Filed Oct. 11, 1954  3 Sheets-Sheet 2

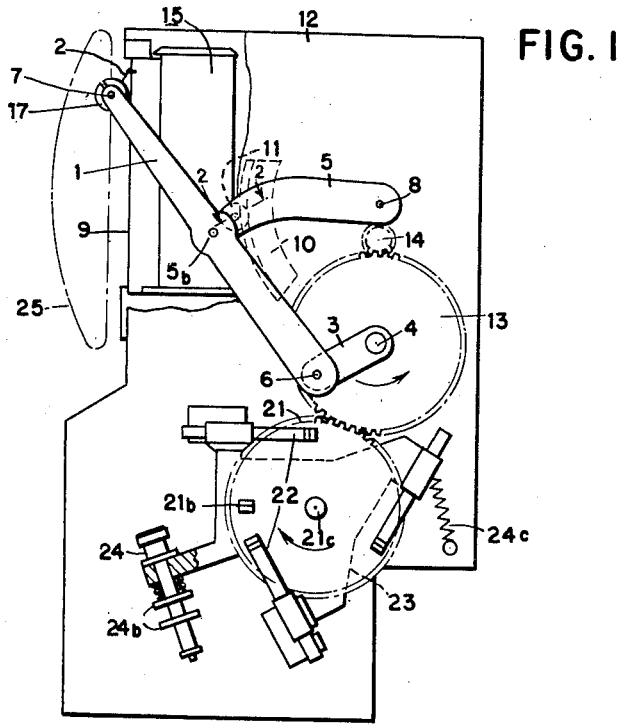
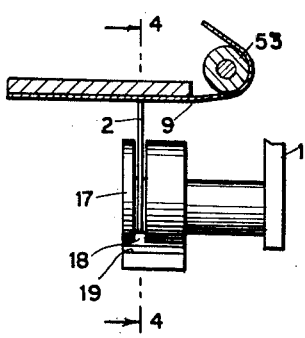
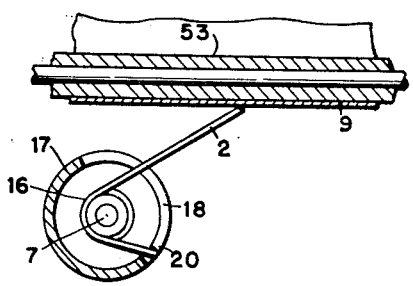
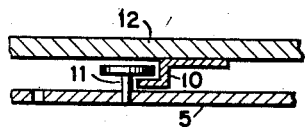

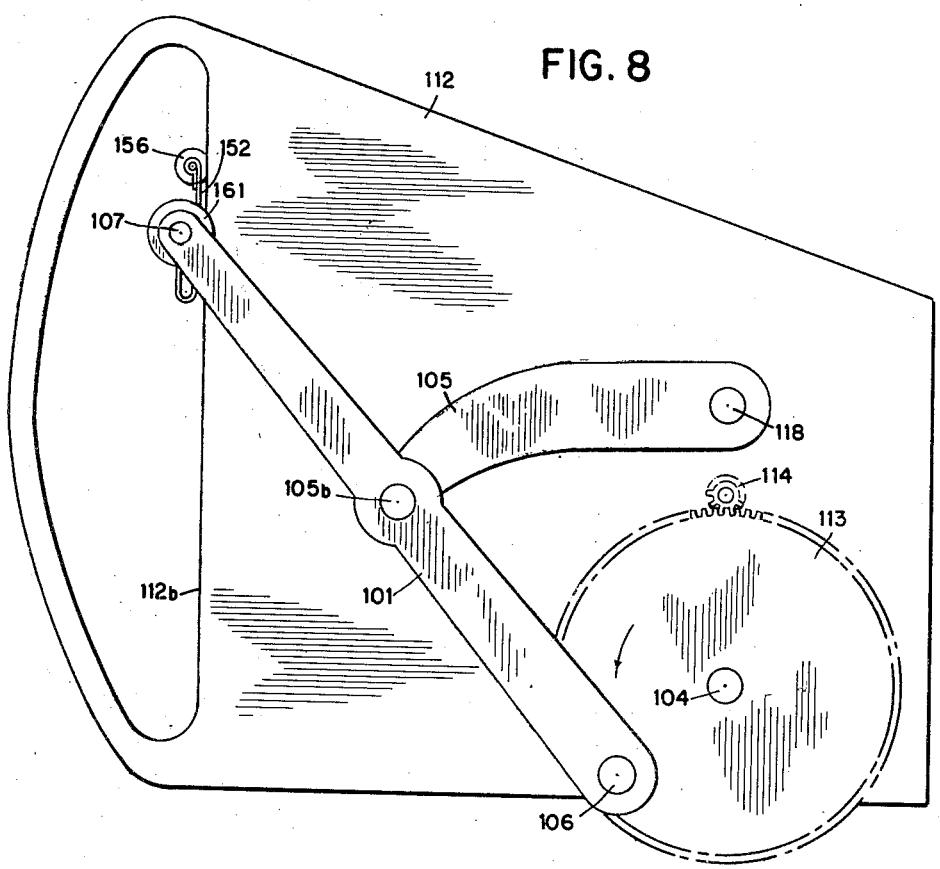
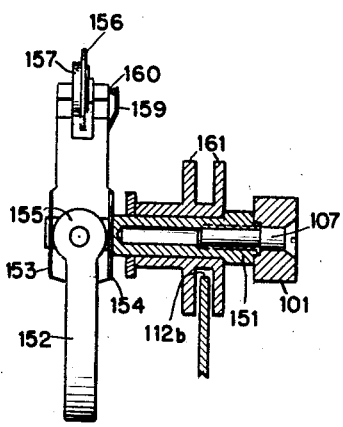
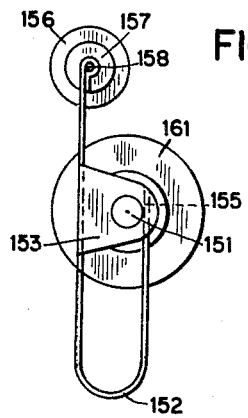

United States Patent Office 2,812,997
Patented Nov. 12, 1957

2,812,997

RECORDING APPARATUS PARTICULARLY FOR MEASURING SHORT INTERVALS OF TIME

Heinz Diekmann and Robert Michelsen, Kiel, and Paul Scheller, Wuppertal-Barmen, Germany, assignors to Electroacustic G. m. b. H., Kiel, Germany, a corporation of Germany Application October 11, 1954, Serial No. 461,596

Claims priority, application Germany October 12, 1953

18 Claims. (Cl. 346—116)

Our invention relates to apparatus for recording a sequence of measuring pulses with the aid of a stylus which periodically travels across a chart and, at singular points of travel, produces recording marks in response to signal pulses being received. In a more particular aspect, the invention relates to recorders suitable for the measuring of short time intervals, such as for echo sounding, and involves a recorder mechanism which guides the stylus for linear motion during the pulse-receptive portion of cyclical stylus travel.

Apparatus of this kind have become known in various designs. In many depth sounding devices now being used, the stylus is guided by means of an endless band that extends perpendicularly to the feed direction of the record-receiving paper and is driven at constant speed. These apparatus have the disadvantage of requiring a large height which greatly exceeds the minimum dimension determined by the width of the record-receiving chart strip. Besides, the portion of stylus travel utilized for the recording operation in these apparatus is only a relatively small fraction, for instance one quarter, of the total cyclical travel of the stylus.

Other known apparatus have a stylus which reciprocates along a straight-motion guideway, the utilizable stroke being slow and the return stroke as fast as possible. Recorders of this type operate impact-wise and therefore are not free of vibration and noise; besides, the large forces of acceleration caused by the non-uniform motion of the stylus result in considerable wear and stresses which make the apparatus readily susceptible to trouble.

It is an object of our invention to devise a recording apparatus of quiet operation which can be given small overall dimensions in conjunction with a relatively large utilizable stroke of stylus travel, thus combining the advantages of the known recorders while avoiding their above-mentioned shortcomings.

Another object of the invention is to provide a recording apparatus with such a spatially favorable arrangement of the reciprocating stylus and record-receiving parts that the recording paper can readily be accommodated in a magazine easily separable from the rest of the apparatus to permit a convenient and rapid exchange.

Still another object of the invention is to improve the stylus mechanism of such apparatus so as to produce thin and clear recording marks without excessive wear of the stylus, thus affording greatest possible accuracy of recording for long useful life periods of one and the same stylus.

According to one feature of our invention, the stylus in recording apparatus of the general type mentioned above is mounted on one end of a carrier lever which is driven from a continuously rotating crank; and the carrier lever is guided, for linear motion of the stylus along the pulse-receptive stroke, by means of a guide member which forms a circularly arcuate path about a fixed point, along which the fulcrum of the carrier lever reciprocates during each cycle of stylus travel. According to a more specific feature, the guide member for the stylus carrier consists of an arm of which one end is pivoted about a stationary pivot pin on the housing or supporting structure of the apparatus, while the other end of the guide arm is linked with the stylus carrier to provide a fulcrum point therefor.

According to another feature of our invention, the geometric proportions of the parts that form the guide mechanism for the stylus are such that the stylus-carrying end of the carrier or the recording point of the stylus, when traveling along the utilizable, linear portion of travel, moves at constant velocity for a uniform revolving speed of the driving crank.

According to a more specific feature of the invention, the stylus carrier is essentially a double-armed lever whose fulcrum is located at the midpoint; the effective length of the pivoted guide member is equal to one half of the length of the stylus carrier measured between its crank-driven point and the axis of the stylus; and the radial length of the crank is equal to one quarter of the length of the stylus carrier, while the distance of the stationary pivot point of the guide member from the axis of the crank shaft is equal to two fifths of the carrier length. By virtue of these length ratios, the theoretical departures of the stylus speed from uniformity are smaller than the inevitable inaccuracies due to clearance beetween the various parts of the guiding and driving mechanism and hence are negligible relative to such inaccuracies.

According to another feature of the invention, relating to a preferred embodiment, the parts of the stylus-guiding and driving mechanism, comprising the stylus carrier, the crank, and the guide member, are movable in a plane which extends in perpendicular relation to the recording surface. This has the advantage that not only the height but also the width of the apparatus can be kept within very small limits because the entire mechanism for moving the stylus extends in the direction of the depth of the apparatus. This makes it possible to mount the recording apparatus, including its driving mechanism, within a housing whose front surface is not appreciably larger than the record-receiving chart surface or the window through which the surface is to be observed.

A recording apparatus according to the invention can readily be designed as a measuring instrument for determining distances, for instance by echo sounding. For this purpose, and according to another feature of our invention, a cam disk is connected with the driving device of the stylus mechanism, and this cam disk is co-operatively connected with electric contact means that control the pulse transmission determining the beginning of the individual measuring operations. The cam-controlled contact means may also serve to release any other operations that are to be synchronized with the stylus motion, for instance to release another indicating device or recorder having a different measuring range.

The foregoing and other objects, advantages and features of the invention will be apparent from the following description in conjunction with the embodiments exemplified on the drawing with reference to recording apparatus applicable for depth sounding and operating with the aid of electric sparks for producing the individual recording marks.

Fig. 1 shows the chassis of the apparatus in a lateral view onto the mechanism for driving and guiding the recording stylus.

Fig. 2 shows a detail of Fig. 1 seen from above and in section.

Fig. 3 is a top view, on a larger scale, of the stylus-holding device in the apparatus according to Fig. 1.

Fig. 4 is a vertical section through the holding device along the line 4—4 in Fig. 3.

Fig. 8 is a side view of another embodiment of recording apparatus according to the invention.

Fig. 9 is a part-sectional view of the stylus assembly of the apparatus shown in Fig. 8; and Fig. 10 is a lateral view of the same stylus assembly.

Figure 5:
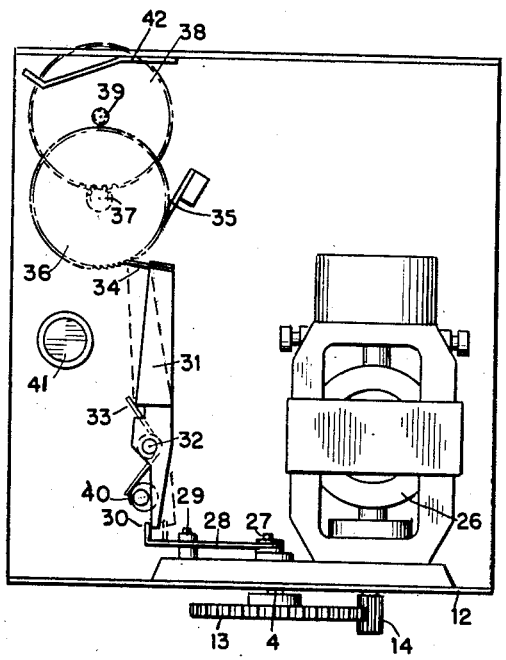
Fig. 5 is a top view of the chassis shown in Fig. 1, indicating the means for driving the stylus-operating mechanism and also the mechanism for advancing the chart strip.
Figure 6:
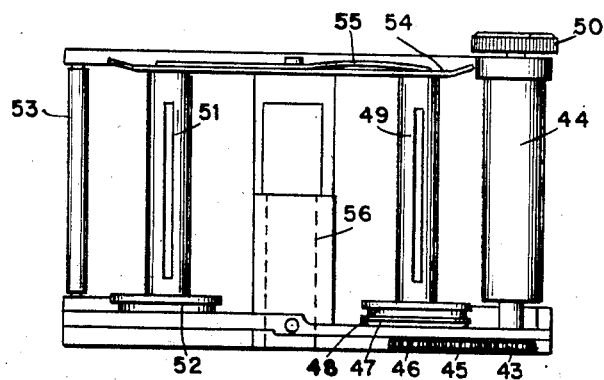
Fig. 6 shows a magazine for accommodating the chart strip, the illustrated view being from the rear (right-hand side) of the chassis shown in Fig. 1.
Figure 7:
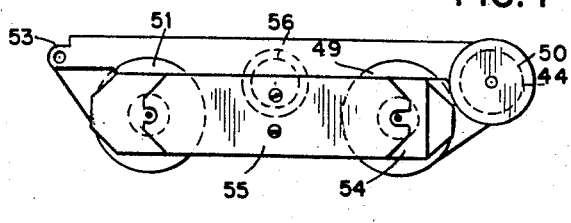
Fig. 7 is a top view of the magazine.

The recorder illustrated in Figs. 1 through 7, has all movable parts mounted on a supporting structure 12 of sheet metal. The front face of the apparatus is directed toward the left in Figs. 1 and 5. The recording stylus 2 is mounted on an elongated stylus carrier 1 and, during the operation of the recorder, travels continuously around a closed cyclical path 25 (Fig. 1). This path is rectilinear along a travel portion close to the recording surface of a strip 9 of chart paper, and has a curved portion forming the idle return stroke of the stylus. Consequently, the stylus is in recording relationship with respect to the chart paper only when traveling downward along the linear portion of the cycle, being moved away from the paper when passing through the curved return stroke. The chart strip 9 is accommodated in a magazine 15 to be more fully described in a later place. With reference to Fig. 1, the recording strip 9 is intermittently advanced in a feeding direction perpendicular to the plane of illustration. At the moment when, during the linear downward stroke of the stylus, a recording pulse is received, a mark is produced on the recording strip, for instance by passing a spark discharge from the stylus through the paper.

The stylus carrier 1 is linked by a crank pin 6 to a crank 3 which, in the illustrated embodiment, is formed by a spur gear 13. Gear 13 is mounted on a continuously revolving constant speed shaft 4 driven by a pinion 14 (Figs. 1, 5) on the shaft of an electric motor 26 (Fig. 5). The stylus carrier 1 is guided by a guide arm 5 which is pivoted on a stationary pin 8 of the supporting structure 12. The arm 5 is linked to the midpoint of the carrier 1 by means of a fulcrum pin 5b. Consequently, during continuous and uniform rotation of the crank pin 6 in the counterclockwise direction, the carrier 1 oscillates about the axis of the moving fulcrum pin 5b while this fulcrum pin is reciprocating along a circular arc about the axis of the stationary pivot pin 8. In this manner, the above-described linear stroke of active stylus travel and the curved return stroke are brought about.

The guide arm 5 carries a projection 11 (Figs. 1, 2) which enters into a groove formed by a segment 10 which is rigidly mounted on the supporting structure 12 and, together with the projection 11, prevents a lateral deflection of the stylus mechanism in the direction of the axes of movement.

When the crank gear 13 is revolving so that the stylus travels on the above-described cyclical path, the downward stroke is traversed at a speed in strictly linear proportion to the angular speed of the crank gear 13. Consequently, the speed of linear stylus travel during the pulse-receptive stroke is constant when gear 13 revolves at constant speed.

The crank gear 13 is in meshing engagement with a control disk 21 also mounted for rotation on the chassis of the apparatus. The control disk 21 has a dog pin 21b for actuating a number of peripherally distributed contacts 22 which in this embodiment serve for controlling the transmission of measuring pulses during echo sounding operation. In the illustrated example, three contacts 22 are provided which can be selectively and individually placed in operation in order to set the apparatus for respectively different measuring ranges. The contacts 22 are secured to a contact carrier 23 which is disposed beneath the cam disk 21 in coaxial relation thereto. An adjusting screw 24, in threaded engagement with lugs 24' of the supporting structure 12, permits adjusting the contact carrier in the tangential direction in opposition to the force of a spring 24c. This permits selectively changing the zero point of the measuring operation, for instance in accordance with the depth at which the pulse transmitter or receiver used for depth sounding is mounted beneath the water level.

According to Figs. 3 and 4, the stylus assembly mounted on the free end of the carrier 1 comprises a cage 17 which has an arcuate, peripheral slot 18 and a second slot 19 extending parallel to the axis of the cage. The stylus 2 proper is formed by the straight free end of a helical spring 16 whose turns extend around the axle pin 7 of the cage. The other end 20 of the spring 16 is fixed by abutment against one end of the longitudinal slot 19. When the stylus carrier 1, according to Fig. 1, is moving downwardly along the surface of the chart strip 9, the cage 17, rigidly mounted on the end of the carrier 1, performs together with the carrier a rotary movement relative to the supporting structure of the apparatus. The force of spring 16 acts in opposition to this rotary movement so that the free end of the spring, forming the stylus 2, remains in contact with the chart surface and resiliently retains this contact in all positions at the same angle of inclination relative to the chart surface. To permit such a relative rotary movement between the stylus 2 and the body of cage 17, the slot 18 must be given a sufficient arcuate length as apparent from Fig. 4.

The top view shown in Fig. 5 of the recorder chassis is drawn on a somewhat larger scale than Fig. 1, particularly with reference to the depth (horizontal in Fig. 5) of the apparatus, and is somewhat distorted in order to prevent obscuring the paper feed mechanism. That is, in Fig. 5 the drive motor 26 is shown displaced toward the rear (right-hand side in Fig. 5) of the apparatus, and the pinion 14 on the motor shaft is accordingly shown in a position different from that in Fig. 1.

The paper feed device comprises a cam or eccentric pin 27 mounted on the shaft 4 of the crank disk 13 (Figs. 1, 5). A pusher rod 28 has one end pivotally connected to the eccentric pin 27 and carries a lug 30 on its other end. During operation of the pusher rod 28, the lug 30 acts upon the end of a swing lever 31. A guide 29 providing a slide surface is mounted on the supporting structure 12 and prevents the pusher rod 28 from escaping in the lateral direction.

The swing lever 31 is pivotally mounted on a pin 32 of the supporting structure 12 and is biased by a spring 33 seated on the same pivot pin 32. One end of spring 33 presses against an arm of the swing lever 31 in the clockwise direction indicated by an arrow. As a result, the other arm of swing lever 31 is kept in engagement with the lug 30 of the pusher rod 28, thus following the return movement of the pusher rod. This clockwise movement is limited by a stationary stop formed by an eccentric 40 which is mounted on the supporting structure 12. The eccentric 40 is rotatably adjustable for setting the swing lever 31 to a desired angular deflection, thus permitting a corresponding adjustment of the amount of paper feed controlled by the swing-lever movement. When the stop position of the swing lever 31 is determined as shown by full lines, this lever, when in operation, moves through a larger angle of swing than occurring if the lever is stopped in the position shown by dotted lines, the latter position corresponding to the smallest amplitude of swing.

The swing lever 31 carries a pawl member 34 engageable with the teeth of a spur gear ratchet wheel 36 which cooperates with a stationarily mounted detent 35. The ratchet wheel 36 is joined with a coaxial pinion 37 meshing with a spur gear 38. A pinion 39 on the shaft of spur gear 38 (Fig. 5) is in engagement with the driving gear 43 (Fig. 6) of the chart-strip magazine when this magazine is inserted into the chassis of the apparatus. The supporting structure 12 of the chassis carries a cylindrical column 41 (Fig. 5) which forms a seat for the magazine now to be described.

The magazine has in its middle portion a cylindrical sleeve 56 (Figs. 6, 7) whose bore is placed over the column 41 (Fig. 5) when the magazine is being inserted into the chassis. During insertion, the left-hand side of the magazine (Figs. 6, 7) is turned toward the front out of the apparatus. That is, referring to Figs. 1 and 5, the magazine when being placed onto the column 41 first projects toward the left beyond the structure 12. Once seated on the column 41, the magazine is turned about the column in the clockwise direction (relative to column 41 in Fig. 5) into the proper position shown in Fig. 1. An arresting or latching spring 42 (Fig. 5) then secures the magazine in that position.

As apparent from Fig. 5, a driving spur gear 43 is mounted near the lower edge of the magazine on the shaft of the feed roller 44 for the recording strip. The upper end of the shaft carries a knurled knob 50 which permits advancing the recording strip by hand if desired. The drive gear 43 meshes with an intermediate gear 45 which in turn engages a pinion 46 on the shaft of a drive disk 47 located within the magazine.

The take-up roll 49 of the magazine is coupled with the disk 47 by a slip clutch 48. The supply roll 51 for the recording strip is inserted into the interior of the magazine in contact with an intermediate friction disk 52 acting as a brake. The magazine is further provided with a guide roller 53. When the magazine is loaded and in operative condition, the recording strip 9 passes from the supply roll 51 over the guide roller 53 (Figs. 3, 4, 6, 7), thence to the feed roller 44 (Figs. 6, 7) and to the take-up roll 49. The front surface of the recording strip, when in properly tensioned condition, forms a plane surface between the rollers 53 and 44. This flat surface comprises the recording surface of the chart to be marked by the stylus.

The supply roll 51 and the take-up roll 49 are inserted from the front (relative to Fig. 6) into the magazine and are held in position by a holding spring 54 and by a pressure spring 55 acting upon the holding spring. The above-mentioned supporting sleeve 56 is located in the center of the magazine between the axes of the rolls 49 and 51. As mentioned, this sleeve enters into engagement with the cylindrical holding column 41 (Fig. 5) of the chassis structure; and, also as mentioned, the drive gear 43 of the feed roller 44 (Fig. 6) is in meshing engagement with the pinion 39 (Fig. 5) when the magazine is in operative position.

The illustrated paper-feed device secures a uniform advance of the recording strip passing over the feed roller 44. The take-up roll 49 driven through the slip clutch 48 varies its speed of rotation depending upon the diameter of the rolled-up amount of paper, this variation in angular speed being secured by the slip action of the clutch 48.

In order to obtain the desired rectilinear path of travel for the stylus 2 during the downward portion of its cyclical movement, the parts are preferably so dimensioned that the length of the guide arm 5 between the centers of fixed pivot 8 and the arcuately movable fulcrum pivot 5b is equal to one-half of the active length of the stylus carrier 1 between stylus 2 and the axis of crank pivot 6. The radius of eccentricity of crank pivot 6 with respect to shaft 4 is equal to one-quarter of the active length of stylus carrier 1. The fixed pivot 8 is spaced upwardly at the same side of shaft 4 as stylus 2 by a distance equal to two-fifths of the active length of stylus carrier 1, the direction of this spacing being parallel to the vertical rectilinear portion of the closed path of travel 25 which is followed by the center of the stylus supporting shaft 7.

The moving fulcrum pivot 5b is located at the midpoint of the active length of the stylus carrier 1.

According to Figs. 8 to 10 which show another embodiment of the invention, the record-producing member of the stylus assembly is designed as a rotatable circular disk extending perpendicular to the recording surface and parallel to the linear portion of the stylus travel. Such a stylus disk can be given extremely small thickness so that the recorded dots or lines are correspondingly fine and secure an accurate record without entailing excessive wear at the stylus point contacting the surface. This is because any wear is distributed over the entire circumference of the stylus disk and hence is negligibly slight at any particular point of the periphery. According to another feature of the invention, the thin stylus disk is braced and stabilized by means of a bracing disk disposed adjacent and concentric to the stylus disk and having a smaller diameter than the stylus disk.

The stylus disk is preferably mounted on a resilient holder so that it is spring biased against the chart surface. The holder, according to another feature of the invention, consists preferably of a leaf spring which is resilient in a direction perpendicular to the chart surface but rigid in the direction parallel to that surface, the stylus disk being mounted on the deflective end of the leaf spring. According to still another improvement feature of the invention, the above-described guiding means for preventing a lateral deflection of the stylus from the desired path may be disposed at the stylus end of the stylus carrier preferably so that they form part of the stylus assembly. More specifically, these guide means are preferably designed as a revolvably mounted roller to cooperate with a stationary guideway, such as a guide rail or groove, of linear shape.

The recorder shown in Fig. 8 has a stylus assembly mounted on an axle pin 107 of an elongated stylus carrier 101 fulcrumed at its midpoint 105b. The carrier 101 is driven by a crank pin 106 on a crank gear 113, mounted on a crank shaft 104. Shaft 104 is driven by a pinion 114 on the shaft of a drive motor (not shown in Fig. 8). The crank shaft 104 and the shaft of pinion 114 are both journalled in the supporting structure 112 of the recorder chassis which also carries a stationary pivot pin 118 for an oscillating guide arm 105 on which the fulcrum pin 105b for the carrier 101 is mounted. During continuous rotation of the crank gear 113 at constant speed, the stylus axle pin 107 of carrier 101 travels on a closed curve which has a linear portion extending parallel to the recording surface. During its return stroke, the stylus travels on an arc remote from the recording surface so that the stylus assembly is lifted off the chart surface as described with reference to the embodiment of Figs. 1 through 7.

The stylus assembly of the recorder, shown separately in Figs. 9 and 10, comprises a substantially U-shaped leaf spring 152. One end 155 of the spring is firmly riveted to a sleeve 151 mounted on the axle pin 107 of the stylus carrier 101. Two lugs 153, 154 of the leaf spring have respective bores coaxially seated on an extension of the sleeve 151, thus securing the leaf spring 154 in the proper position in which its width extends parallel to the recording surface. The free end of the leaf spring 152 forms eyelets in which an axle pin 158 is rotatably mounted. The stylus proper consists of a thin disk 156 joined with a rigid bracing disk 157 of greater thickness but smaller diameter. The two disks 156 and 157 are firmly secured to the axle pin 158 and are revolvable together with that pin. A resilient contact spring 159 attached to the leaf spring 152 has a contact point 160 in engagement with the axle pin 158 and serves to secure a reliable electric connection to the stylus disk for applying between the disk and the conductive backing of the chart paper a marking voltage in response to the reception of a signal pulse.

A grooved roller 161 is revolvably mounted on the sleeve 151. The groove of this roller straddles a straight guiding edge 112b formed by the support structure 112 of the chassis (see Fig. 8). In this manner, the roller 106 provides a reliable guidance for the stylus assembly which prevents the assembly from laterally deflecting from the correct linear path of travel. These guiding means thus perform a function similar to that of those shown in Fig. 2, but since they are located in proximity to the stylus assembly, a more reliable performance is obtained.

It will be obvious to those skilled in the art upon a study of this disclosure that our invention permits of various modifications and applications other than those specifically illustrated and described, without departing from the essence of the invention and within the scope of the claims annexed hereto.

We claim:

1. Apparatus for recording short intervals of time or other physical quantities, comprising a support structure, means on said structure for advancing a chart having a recording surface, a movable stylus having a path of travel including a linear portion parallel to said recording surface and extending in a direction across the chart-advancing direction, a shaft revolvable on said support for driving said stylus, crank means on said shaft, a stylus carrier having one portion thereof pivotally connected to said crank means, said stylus being mounted on said carrier in spaced relation to said pivotally connected portion, a guide arm having one end pivoted to said structure, the other end of said arm being pivotally connected to said carrier intermediate said stylus and said portion of said carrier which is pivotally connected to said crank arm, whereby said carrier during revolution of said shaft oscillates about a moving fulcrum which, in turn, oscillates about the pivot axis of said arm thus producing said linear portion of stylus travel.

2. Apparatus for recording short intervals of time or other physical quantities, comprising a support structure, means on said structure for advancing a chart having a recording surface, a cyclically movable stylus having a closed continuous path of travel lying in a plane normal to said recording surface, said path comprising a rectilinear portion parallel to said recording surface and extending in a direction across the chart-advancing direction, said path further comprising a return portion spaced away from said chart beyond said rectilinear portion, a shaft carried by said support for driving said stylus, crank means on said shaft, an elongated stylus carrier, said stylus being mounted on one end of said carrier and said crank means being linked to the other end of said carrier, a guide arm pivoted on said structure at a pivot point located at the same side of said shaft as said stylus and spaced from said shaft in a direction parallel to said rectilinear portion of said path, said guide arm being linked with said carrier at a fulcrum point between said crank means and said stylus so as to produce constant speed movement of said stylus along said rectilinear portion of said path in response to constant-speed revolution of said shaft.

3. Apparatus for recording short intervals of time or other physical quantities, comprising a support structure, means on said structure for advancing a strip chart having a recording surface, a periodically movable stylus having a path of travel comprising a linear portion extending along said surface transversely of the chart-advancing direction, a shaft revolvable on said support for driving said stylus, crank means on said shaft, an elongated stylus carrier, said stylus being mounted at one end of said carrier and said crank means being pivotally connected to the other end of said carrier, a guide arm having one end pivoted to said structure providing a fixed pivot point located at the same side of said shaft as said stylus, the other end of said arm being pivotally connected to said carrier at the midpoint of the active length of said stylus carrier measured between said stylus and said pivotal connection to said crank means to provide a moving fulcrum for said carrier, said arm having between said fixed pivot point and said fulcrum point a length equal to one half of said active length of said carrier, said crank means providing a radius of eccentricity equal to one quarter of said active length of said carrier, and said fixed pivot point being spaced from the axis of said shaft at the same side of said shaft as said stylus and in a direction parallel to said linear portion of said path of travel by a distance equal to two fifths of said active carrier length, whereby the speed of said stylus along said linear portion of said path of travel is constant for a constant speed of rotation of said shaft.

4. Apparatus for recording short intervals of time or other physical quantities, comprising a support structure, means on said structure for advancing a chart having a recording surface, a cyclically movable stylus having a path of travel comprising a linear portion extending in a direction across the chart-advancing direction, a stylus drive mechanism comprising a stylus carrier and a crank and a guide arm all disposed and movable relative to one another in respective planes perpendicular to said recording surface, said crank having a crank shaft revolvably mounted on said structure for imparting movement to said mechanism, said carrier being pivotally connected to said crank, said stylus being mounted on said carrier at a distance from said pivotal connection to said crank, said guide arm having one end pivoted to said structure and having the other end pivotally connected to said carrier at a point intermediate said crank connection and said stylus, whereby said carrier during revolution of said shaft oscillates about a fulcrum which, in turn, oscillates about the pivotal axis of said connection of said arm to said structure, thus producing said linear portion of said path of stylus travel.

5. Apparatus according to claim 1, comprising stationary guide means mounted on said support structure and providing a guideway comprising a straight portion and an arcuate portion generally concentric to said fixed pivot point of said guide arm, and said guide arm having means movable along said guideway and engageable therewith to prevent lateral deflection of said carrier and stylus.

6. Apparatus according to claim 4, comprising a stationary guideway on said structure, said guideway forming a groove of arcuate shape generally concentric to said pivot point of said guide arm, and said guide arm having a projection entering into said groove for preventing said carrier from deflecting in a direction parallel to the axis of said shaft.

7. Recording apparatus, comprising a support structure, chart-accommodating means disposed on said structure and having feed means for advancing a chart in a given direction and backing means extending linearly across said direction, a periodically movable stylus having a cyclical travel path including a linear active stroke and a curved return stroke, said linear stroke extending parallel and juxtaposed to said backing means so that said stylus is engageable with the chart, said return stroke being curved away from said backing means so that said stylus is lifted off the chart, a stylus carrier on which said stylus is mounted, a drive crank rotatably mounted on said support structure and linked with said carrier, said carrier having a fulcrum between said crank and said stylus, carrier guide means engaging said fulcrum and forming for said fulcrum an arcuate guide path about a fixed point of said structure, said point being spaced from the axis of rotation of said crank, whereby said crank when rotating causes said carrier to angularly oscillate about said fulcrum while said fulcrum is reciprocating on said guide path, said stylus being angularly movable relative to said carrier in a plane parallel to that of the angular movement of said carrier, and said stylus comprising spring means biasing said stylus toward said backing means whereby said stylus, during said linear stroke, changes its angular relation to said carrier to compensate for the changing angular position of said carrier.

8. Apparatus according to claim 7, said stylus consisting of a circular disk, and said spring means comprising a spring member secured to said stylus carrier, said stylus disk being revolvably mounted on said spring member for rolling engagement with the chart.

9. Apparatus according to claim 8, comprising a bracing disk coaxially joined with said stylus disk to revolve together therewith, said bracing disk having greater thickness and a smaller diameter than said stylus disk.

10. Apparatus according to claim 1, comprising an axle mounted on said carrier near said stylus and having an axis parallel to the fulcrum axis of said carrier, said stylus being secured to said axle and rotatable relative to said carrier in a plane parallel to that of carrier movement, and said stylus having spring bias tending to rotate said stylus into contact with said recording surface.

11. Apparatus according to claim 1, comprising a cage mounted on said carrier near said recording surface, said cage having an axis parallel to the fulcrum axis of said carrier and having an arcuate slot concentric to said cage axis, a helical spring disposed in said cage and having an end portion which extends through said slot to be laterally guided thereby, said stylus being formed by said end portion of said spring, whereby said stylus resiliently compensates angular changes in stylus position during movement of said carrier.

12. Recording apparatus, comprising a support structure, chart-accommodating means on said structure for advancing a chart having a recording surface, said chart-accommodating means having a revolvable feed member for imparting movement to the chart, a transmission geared with said feed member and having a ratchet, a spring biased swing lever pivotally mounted on said structure and having a pawl end engageable with said ratchet for driving said feed member, a periodically movable stylus cooperative with the chart, a drive shaft revolvably mounted on said structure, a stylus carrier pivotally mounted on said structure, drive mechanism linking said shaft with said carrier for imparting oscillatory movement to said carrier, said stylus being mounted on said carrier, a cam connected with said shaft to be driven thereby, and a connecting member engaged by said cam and abuttable against said swing lever in opposition to the spring bias of said swing lever, whereby said feed member is caused to incrementally operate in a given time relation to the operation of said stylus.

13. Apparatus according to claim 10, comprising a cam connected with said gear to rotate in fixed time relation to said control member, said chart-advancing means having a revolvable feed member for imparting movement to the chart, a transmission geared with said feed member and having a ratchet, a spring biased swing lever pivotally mounted on said structure and having a pawl end engageable with said ratchet for driving said feed member, and a connecting lever pivotally mounted on said structure and having one end in engagement with said cam and the other end abuttable against said swing lever.

14. Apparatus according to claim 11, comprising an eccentric mounted on said structure and rotatably adjustable relative thereto, said eccentric being located in the path of the spring-biased return movement of said swing lever and having its periphery engageable by said swing lever to form a stop therefor, whereby the amount of incremental feed movement imparted to the chart is controllable by rotary adjustment of said eccentric.

15. Recording apparatus, comprising a support structure, a stylus mechanism mounted on said structure and having a periodically movable stylus, said stylus having a closed travel path including a curved portion and a linear portion, a magazine having a supply roll and a take-up roll for a chart strip and having strip guide means disposed between said two rolls and forming a linear backing for the strip in a direction parallel to the axes of said respective rolls, said magazine being inserted into said structure when the apparatus is in operating condition and being removable as a whole from said structure, said linear backing extending in parallel and juxtaposed relation to said linear portion of said path of stylus travel and remote from said curved portion when said magazine is inserted so that said stylus is engageable with the strip during said linear travel portion, and an intermittently operative strip feed mechanism mounted on said structure and connected with said stylus mechanism to operate together therewith, said magazine having drive coupling means connected with said take-up roll and engageable with said feed mechanism only when said magazine is inserted, said feed mechanism advancing said chart strip during movement of said stylus along said curved portion of said travel path.

16. Apparatus according to claim 15, comprising a substantially cylindrical holder column firmly mounted on said structure, said magazine having a hole mating said column to permit inserting said magazine by placing it with said hole upon said column, and said magazine when placed upon said column being rotatable about said column into and out of operative position, and arresting means on said structure for securing said magazine in operative position.

17. Recording apparatus of the class described, comprising in combination: a support structure; a continuously revolving constant speed drive shaft carried by said support; crank means driven by said shaft; an elongated stylus carrier having one end portion pivoted to said crank means for movement therewith; stylus means disposed at the other end portion of said carrier; a link member having one end pivoted to said support, the other end of said link member being pivotally connected to said carrier centrally intermediate its ends, whereby said stylus means is constrained to travel continuously around a closed path comprising a curved portion and a rectilinear portion along which said stylus moves at constant speed; means carried by said support for maintaining a strip chart movably disposed in proximity to said rectilinear portion of said path with a recording surface portion of said chart extending parallel thereto to be marked by said stylus means in the course of said constant speed movement; and intermittently operative chart feeding means driven with said shaft, said feeding means advancing said chart transversely of said rectilinear portion of said path during travel of said stylus means along said curved portion thereof.

18. Recording apparatus of the class described, comprising in combination: a support structure; a continuously revolving constant speed drive shaft carried by said support; crank means driven by said shaft; an elongated stylus carrier having one end portion pivoted to said crank means for movement therewith; stylus means disposed at the other end portion of said carrier; a link member having one end pivoted to said support, the other end of said link member being pivotally connected to said carrier centrally intermediate its ends, whereby said stylus means is constrained to travel continuously around a closed path comprising a curved portion and a rectilinear portion along which latter portion said stylus means moves at constant speed; means carried by said support for maintaining a strip chart movably disposed in proximity to said rectilinear portion of said path with a recording surface portion of said chart extending parallel thereto to be marked by said stylus means in the course of said constant speed movement; signal control means driven with said shaft for causing a signal to be given at a predetermined point in the course of travel of said stylus means, said signal being given at the beginning of each time interval to be measured, said stylus means being adapted to mark said chart for indicating the termination of said interval; and intermittently operative chart feeding means driven with said shaft, said feeding means advancing said chart transversely of said rectilinear portion of said path during travel of said stylus means along said curved portion thereof.

References Cited in the file of this patent

UNITED STATES PATENTS

| | | |
|---|---|---|
| 1,589,727 | Travell | June 22, 1926 |
| 2,442,586 | Clark | June 1, 1948 |
| 2,557,197 | Nelson | June 19, 1951 |
| 2,594,136 | Di Maggio | Apr. 22, 1952 |
| 2,625,458 | Ruhland | Jan. 13, 1953 |

FOREIGN PATENTS

| | | |
|---|---|---|
| 534,095 | Germany | Sept. 23, 1931 |